Feb. 13, 1940.  W. SWALLOW  2,190,551
VEHICLE
Filed Sept. 26, 1935    3 Sheets-Sheet 3
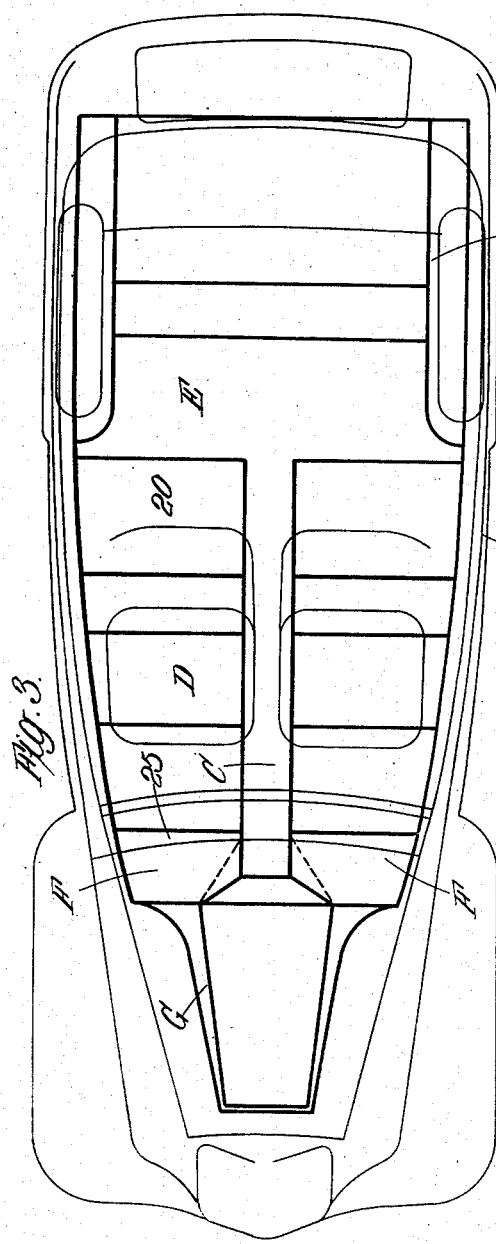
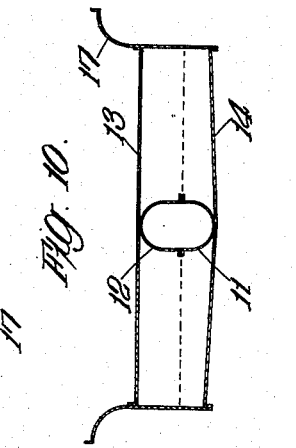
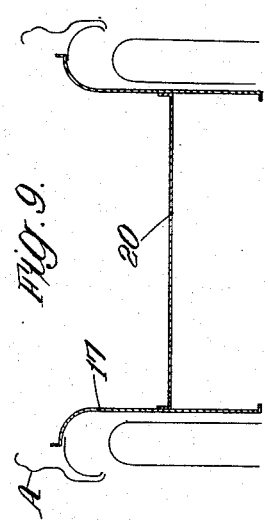
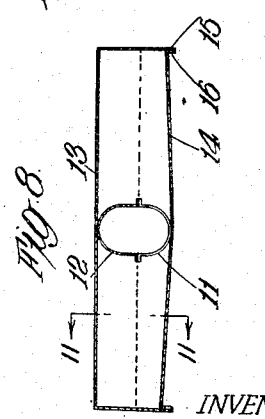
INVENTOR.
WILLIAM SWALLOW
BY
ATTORNEY Patented Feb. 13, 1940

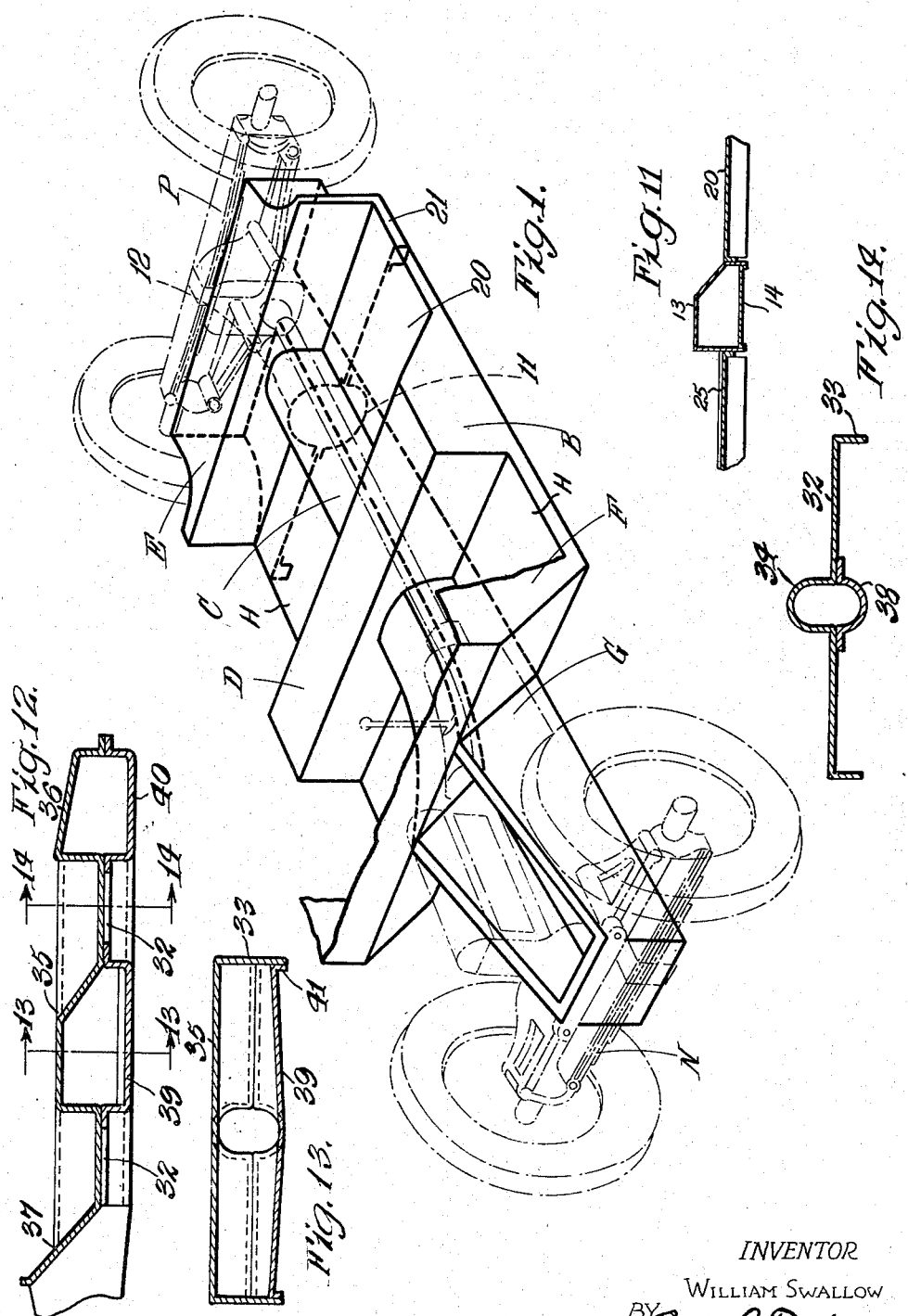

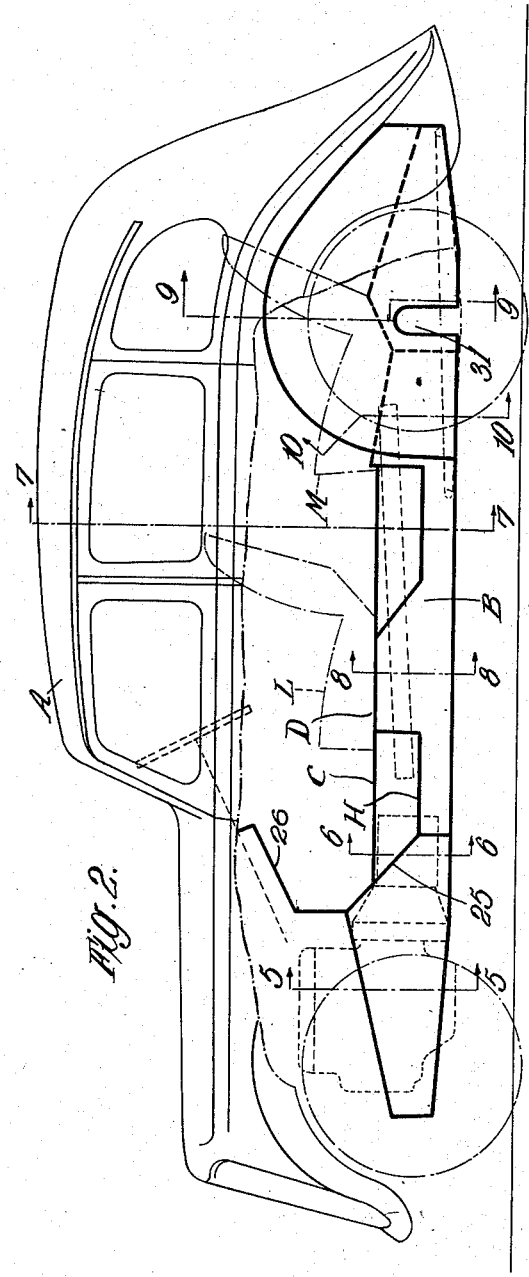
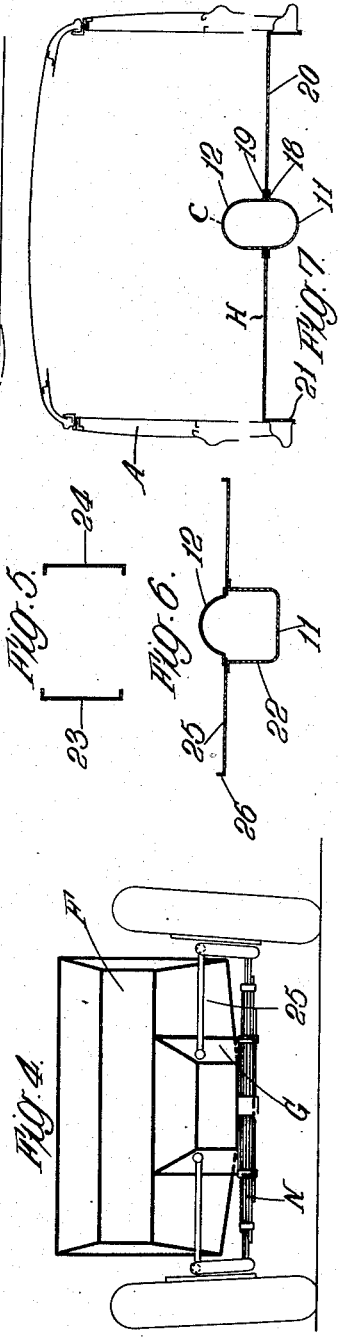

2,190,551

UNITED STATES PATENT OFFICE 2,190,551

VEHICLE

William Swallow, Headington, Oxford, England, assignor to The Pressed Steel Company of Great Britain Limited, Oxford, England, a British company Application September 26, 1935, Serial No. 42,188
In Great Britain October 5, 1934

8 Claims. (Cl. 296—28)

The present invention relates to an improved construction of vehicle and has for its object to provide a vehicle built lower than heretofore, giving greater stability, particularly when cornering, eliminates, or at least minimises, the threshold step into the body, one which effects a saving in weight without loss of strength or stiffness, one which effects a saving in production costs, and lends itself readily to the construction of bodies of streamline form.

According to the present invention there is provided a vehicle comprising a body superstructure and an underframe serving as both body underframe and chassis and including a sheet metal floor structure, which floor structure has formed integrally therewith or has integrally secured thereto as by welding, a keelson, which keelson is closed by a keel, said keel and keelson providing a box section central principal load-carrying sill member having a high resistance to torsion and weaving.

The floor structure is preferably provided also with integrally joined transverse hollow section portions or frame members and lateral vertically deep edge flanges, the transverse frame members being closed to form box sections by cover plates and the edge flanges forming longitudinally extending portions not calculated in themselves to have any substantial load-carrying function but of a depth sufficient to provide faces arranged to serve for the attachment of the body superstructure or body proper.

A vehicle construction of this kind may be regarded as of the so-called "back-bone" type vehicle, and the "back-bone" and "rib" (or transverse frame members) may be formed from sheet metal as a one piece stamping and be formed integrally with, as by welding, a sheet metal floor structure, so that the base of the vehicle is comprised of the unitary load sustaining center sill member and the floor structure.

Whilst this type of construction lends itself very readily to the employment of independent wheel suspension it is not limited thereto but may make use of the more orthodox methods of spring suspension.

The central principal load-sustaining sill member may be extended forwardly of the normal front line of the body to constitute a cradle adapted to carry the power unit and other automotive organs.

The transverse frame members or "ribs" may be arranged to carry directly the seats of the vehicle, whilst the keel and/or keelson may constitute a tunnel for reception of the transmission shaft.

The central principal load-sustaining sill member or "back-bone" and the transverse frame members or "ribs" may be formed of channel section preferably downwardly presenting the open sides of each channel section being closed by the keel and transverse cover plates respectively, or may be of box, cylindrical or any other section.

At the door openings the thresholds may be at a level not higher than the floorboards themselves, thereby ensuring easy entry into the vehicle, whilst the edges conforming to the outer door of the body may be down-turned to provide strength and to facilitate the mounting of the body thereon.

The invention will now be described with reference to the accompanying drawings, of which:

Figure 1 is a line perspective view of the underframe structure of the vehicle, showing independent suspension of the front and rear wheels certain parts associated with the underframe being shown in light dotted lines such as the motor, transmission and wheel suspension, the heavy dotted lines just as the heavy full lines defining the outline of the underframe structure;

Figure 2 is an outline side elevation, showing orthodox suspension of the rear wheels, certain parts, such for example as the motor and transmission, associated with the vehicle structure being represented diagrammatically in their relation to the structure by light dotted lines. This figure is a slight modification of the showing in Figure 1 in that the height of the main longitudinal central sill C as shown in Figure 1 is according to this figure at a higher level with respect to the cross member D, being substantially at the same level as the cross member D in this figure whereas it is shown at a lower level below the level of the cross member D in Figure 1. This difference is, however, immaterial from a structural standpoint;

Figure 3 is an outline plan view of Figure 2;

Figure 4 is an outline front view of Figure 2, and

Figures 5, 6, 7, 8, 9 and 10 are sections in outline on the lines 5—5, 6—6, 7—7, 8—8, 9—9, 10—10 of Figure 2.

Figure 11 is a longitudinal detail sectional view substantially along the line 11—11 of Figure 8 indicating one form which the detail structure in this region may take.

Figure 12 is a longitudinal section taken in the region of the section line 11—11 of Fig. 3 but showing a modified form of the invention;

Figures 13 and 14 show sections on the lines 13—13 and 14—14 of Figure 12.

The body proper A is mounted on the underframe structure B which comprises the central principal load sustaining sill member C and the transverse frame members D, E, whilst at the forward end of the body extends the transverse framework F adapted for attachment to a dash pan or the like. The sill member C is extended forwardly to act as a cradle G for the purpose of supporting the power unit of the vehicle and the front wheel suspension, whilst the floor structure is shown at H. The members C, D, E and H may be formed as a unitary stamping or may be built up of individual stampings integrally joined together as by welding. The transverse frame E is adapted to support the rear wheel suspension and the transmission mechanism.

In the preferred form of the invention the central sill member C is built up of a keel 11 and a keelson 12 and the transverse frame members D and E are of hollow section being built up of the members 13 and 14 united in their edges as at 15, 16, whilst at the rear of the body members 13 and 14 are flanged to nest with and to be secured to the wheel-arches 17, all said parts being joined into an integral whole as by welding.

The keel 11 and keelson 12 are flanged at 18 and 19 to receive between said flanges the floor structure 20, which over its length corresponding with its engagement with the body is downturned as at 21 a depth sufficient to constitute faces to which the bottom margins of the side walls of said body A are secured, see Figure 7. Forward of the front line of the body the keel 11 changes in section from that shown in Figure 7 to that shown in Figure 6, i. e., of channel section 22 and progressively to that shown in Figure 5 where it is in a form of two inturned channels 23, 24, constituting the main members of the cradle for the power unit. In the region of the dash-pan of the vehicle the floor member 20 is extended upwardly as at 25 to present a toeboard and is further flanged upwardly as at 26 for securement to the body A, Figure 2.

The seats of the vehicle indicated at L and M may be carried directly on the upper faces of the transverse frame members D and E, whilst the cradle G may support directly the front wheel independent suspension N as shown in Figure 1. The transverse frame member E may itself serve as a housing for the rearwheel drive or differential (not shown), the transmission shaft being enclosed within the central sill member C whilst the transverse frame member E may have secured directly thereto a rear-wheel independent suspension P when such is used, as shown in Figure 1. The wheel-arch 17 may be recessed as at 31 to accommodate the rear axle (not shown).

In the embodiment shown in Figures 12 to 14, a one piece stamping comprises the portions 32 of the body flooring proper, a downwardly opening channel formation 34, transversely extending and downwardly opening channel formations 35, 36, downwardly extending flanges 33 along the side margins, and the toe board section 37. The open mouth of the channel portions 34, 35 and 36 are closed by upwardly opening channel members 38, 39 and 40. The ends of the lower transverse members 39 and 40 are provided with flanges 41 which are fastened to the downwardly extending flanges 33 of the upper stamping. The members 34 and 38 form together a closed box sectional girder. The members 35 and 39 as well as the members 36 and 40, form together transversely extending closed box sectional members and at the same time supports of the seats. The flange 33 corresponds to the flange 21 of the embodiment shown in the preceding figures and serves not only as a reinforcement of the under frame structure, but also for the attachment of the body side walls.

I claim:

1. In a combined body underframe and chassis structure for vehicles; a sheet metal flooring; a hollow section downwardly open keelson integral with said flooring; a keel member closing the keelson to form a vertically deep box section central longitudinal principal load carrying sill having a high resistance to torsion and weaving; transverse downwardly presenting hollow section frame members being closed by cover plates to form hollow box section structures; said transverse box section structures being rigidly connected with said flooring, said keelson and said keel; and downturned flanges along the lateral edges of and integral with said flooring, said flanges being of a depth sufficient to provide faces through which bottom parts of body side wall structures may be secured.

2. An underframe for vehicles serving as both body underframe and chassis, and including a sheet metal floor structure having longitudinal side portions, the central part of said floor structure being formed to provide a hollow section keelson opening downwardly and projecting above the main body of the floor, a plate closing the downwardly open keelson and forming a vertically deep box section main central longitudinal load carrying sill therewith having a high resistance to torsion and weaving, the side portions of said floor structure being formed with downwardly extending flanges of a depth sufficient to provide faces against which the body side walls may be secured and hollow box section cross members including the main transverse body of the flooring, said hollow section members integrally joined to the main body of the flooring to form box sections therewith.

3. An underframe for vehicles serving as both body underframe and chassis and including a sheet metal floor structure comprising a main central longitudinal box section load supporting sill having a high resistance to torsion and weaving, and flooring and seat supporting structures extending laterally therefrom to the sides of the frame, the sides of said flooring and seat supporting structures being formed with downwardly extending flanges conforming to the side walls of the body and of a depth sufficient to provide faces to which the side walls of the body are arranged to be directly secured.

4. An underframe for vehicles serving as both body underframe and chassis, and having a sheet metal floor structure having longitudinal side portions, said floor structure comprising a central hollow section downwardly open keelson integral therewith and projecting above the main body of the floor, a keel closing said keelson also of hollow section and projecting below the main body of the floor to form a vertically deep box section structure therewith and providing a central principal load supporting sill having a high resistance to torsion and weaving, and transverse members extending from side to side of the underframe also of substantially box cross section and of a vertical depth substantially equal to the depth of the central longitudinal sill.

5. An underframe for vehicles serving as both body underframe and chassis and having a sheet metal floor structure having longitudinal side portions and embodying a vertically deep box section central principal load carrying sill member having a high resistance to torsion and weaving, and a box section cross member transversely extending at the rear of said main longitudinal sill member, and wheel housings secured to the lateral ends of said cross member and closing the ends of the box cross section.

6. A sheet metal underframe for vehicles serving as body underframe and chassis, said underframe comprising a floor panel having raised transversely extending downwardly open hollow section portions in the region of the seats and depressed transversely extending portions in front of the seats, the longitudinal central portion of said floor panel from the rear seat riser forwardly including an upwardly bowed hollow section part and a keel member closing said part and forming therewith a vertically deep box section structure having a high resistance to torsion and weaving, and the lateral margins of the floor panel being flanged downwardly and conforming to the lower side edges of the body structure and of a depth providing faces against which the body side wall structures may be secured.

7. In a combined body underframe and chassis construction for vehicles; a one piece sheet metal stamping integrally forming the flooring and a vertically opening channel structure, and said channel structure being arranged in the region of the longitudinal middle plane of the vehicle; and a second stamping being of relatively narrow elongated form, said second stamping being fastened to the margins of said channel structure and forming therewith a closed box sectional structure of high resistance to torsion and bending.

8. In a combined body underframe and chassis construction for a vehicle, a sheet metal flooring forming one main element of said construction; a central keel member rigidly fastened to said flooring and extending downwardly therefrom; the side margins of said flooring conforming substantially with the lower margins of separately fabricated body side walls and being provided with longitudinal reinforcements extending downwardly from the flooring to an extent substantially equaling the downward extent of said keel member; said body side walls being fastened to said reinforcements.

WILLIAM SWALLOW.